United States Patent
Kamada et al.

(10) Patent No.: US 10,457,353 B2
(45) Date of Patent: Oct. 29, 2019

(54) BICYCLE REAR SPROCKET ASSEMBLY

(71) Applicant: Shimano Inc., Sakai, Osaka (JP)

(72) Inventors: Kenji Kamada, Osaka (JP); Azusa Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 203 days.

(21) Appl. No.: 15/288,960

(22) Filed: Oct. 7, 2016

(65) Prior Publication Data

US 2018/0099725 A1     Apr. 12, 2018

(51) Int. Cl.
*B62M 9/10* (2006.01)
*F16H 55/30* (2006.01)

(52) U.S. Cl.
CPC ............. *B62M 9/10* (2013.01); *F16H 55/30* (2013.01)

(58) Field of Classification Search
CPC .......... B62M 9/10; B62M 9/105; F16G 55/30
See application file for complete search history.

(56) References Cited

U.S. PATENT DOCUMENTS

| | | | | |
|---|---|---|---|---|
| 5,545,096 A * | 8/1996 | Su | ............................ | B62M 9/10 474/160 |
| 6,340,338 B1 | 1/2002 | Kamada | | |
| 8,235,850 B2 * | 8/2012 | Lin | ........................ | B62M 9/105 474/160 |
| 8,517,874 B2 * | 8/2013 | Reiter | ..................... | B62M 9/10 474/152 |
| 9,278,728 B1 * | 3/2016 | Sato | ........................ | B62M 9/122 |
| 9,297,450 B2 * | 3/2016 | Numata | ................... | F16H 55/08 |
| 9,334,014 B2 * | 5/2016 | Fukunaga | ................ | B62M 9/10 |
| 9,376,165 B2 * | 6/2016 | Oishi | ......................... | B62M 9/10 |
| 9,463,844 B2 * | 10/2016 | Fukunaga | ................ | B62M 9/10 |
| 2011/0092327 A1 * | 4/2011 | Oishi | ........................ | B62M 9/10 474/160 |
| 2012/0225745 A1 * | 9/2012 | Oishi | ........................ | B62M 9/10 474/160 |
| 2016/0059931 A1 | 3/2016 | Fukunaga | | |
| 2016/0207590 A1 * | 7/2016 | Fukumori | ............... | B62M 9/10 |
| 2018/0022415 A1 * | 1/2018 | Oishi | ........................ | B62M 9/10 |

* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A bicycle rear sprocket assembly is basically provided that includes a first sprocket including a first sprocket body and a plurality of first sprocket teeth provided to an outer periphery thereof. Each of a plurality of first circumferential areas has a first circumferential length. A first total number of the plurality of first circumferential areas is an even number. A first circumferential area counting number from a driving surface of a first shifting initiation tooth to a driving surface of a second shifting initiation tooth in a driving rotational direction of the bicycle rear sprocket assembly is an odd number. A second circumferential area counting number from the driving surface of the second shifting initiation tooth to the driving surface of the first shifting initiation tooth in the driving rotational direction is an odd number. The first circumferential area counting number is different from the second circumferential area counting number.

16 Claims, 12 Drawing Sheets

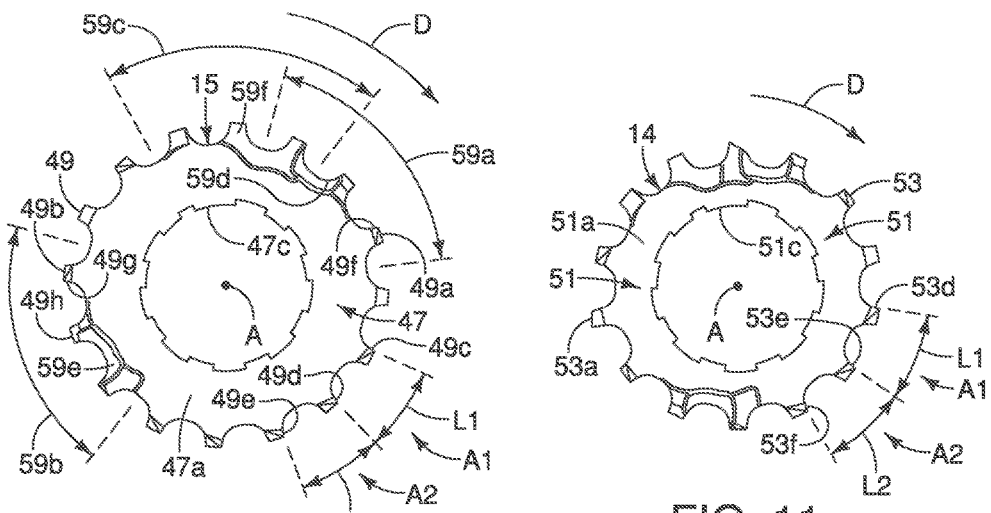
FIG. 10
FIG. 11
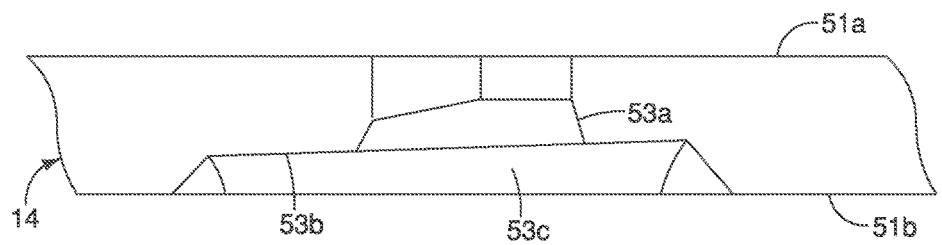
FIG. 12
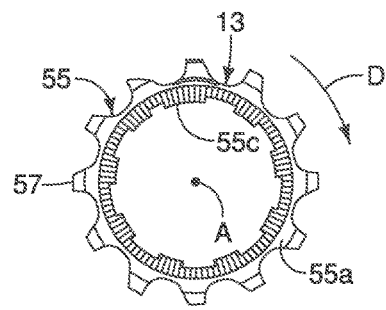
FIG. 13

BICYCLE REAR SPROCKET ASSEMBLY

BACKGROUND

Field of the Invention

This invention generally relates to a bicycle rear sprocket assembly. More specifically, the present invention relates to a sprocket of a rear sprocket assembly configured to provide smooth and reliable shifting.

Background Information

Bicycling is becoming an increasingly more popular form of recreation, as well as a means of transportation. Moreover, bicycling has become a very popular competitive sport for both amateurs and professionals. Whether the bicycle is used for recreation, transportation or competition, the bicycle industry is constantly improving the various components of the bicycle. One area that has been extensively redesigned over the years is the bicycle drive train. Specifically, manufacturers of bicycle components have been continually improving shifting performance of the various shifting components, such as shifters, derailleurs, chain and sprockets.

One particular component of the bicycle drive train that has been extensively redesigned in the past years is the sprocket assembly. Specifically, sprocket assemblies have been designed with improved sprockets to provide smoother and reliable shifting.

SUMMARY

Generally, the present disclosure is directed to various features of a bicycle rear sprocket assembly.

In view of the state of the known technology and in accordance with a first aspect of the present disclosure, a bicycle rear sprocket assembly is basically provided that includes a first sprocket including a first sprocket body and a plurality of first sprocket teeth provided to an outer periphery of the first sprocket body. The plurality of first sprocket teeth include a first shifting initiation tooth and a second shifting initiation tooth. A plurality of first circumferential areas, each of which has a first circumferential length corresponding to a single tooth pitch defined from a driving surface of a tooth of the first sprocket teeth to a driving surface of an adjacent tooth of the first sprocket teeth. The adjacent tooth is adjacent to the tooth without another tooth of the first sprocket teeth therebetween. A first total number of the plurality of first circumferential areas is an even number. The first shifting initiation tooth is disposed in a first shifting facilitation area, and the second shifting initiation tooth is disposed in a second shifting facilitation area. A first circumferential area counting number from a driving surface of the first shifting initiation tooth to a driving surface of the second shifting initiation tooth in a driving rotational direction with respect to a rotational center axis of the bicycle rear sprocket assembly is an odd number. A second circumferential area counting number from the driving surface of the second shifting initiation tooth to the driving surface of the first shifting initiation tooth in the driving rotational direction is an odd number. The first circumferential area counting number is different from the second circumferential area counting number. According to the first aspect of the present invention, a bicycle rear sprocket assembly is provided in which it is possible to reliably complete a shifting operation even when a total tooth number of a bicycle sprocket is an even number and the bicycle sprocket has a plurality of shifting facilitation areas.

In accordance with a second aspect of the present invention, the bicycle rear sprocket assembly according to the first aspect is configured to include a second sprocket including a second sprocket body, and a plurality of second sprocket teeth provided to an outer periphery of the second sprocket body. A plurality of second circumferential areas, each of which has a second circumferential length corresponding to a single tooth pitch defined from a driving surface of a tooth of the second sprocket teeth to a driving surface of an adjacent tooth of the second sprocket teeth. The adjacent tooth being adjacent to the tooth without another tooth of the second sprocket teeth therebetween. A second total number of the plurality of second circumferential areas is an even number and smaller than the first total number of the plurality of first circumferential areas. The second sprocket is adjacent to the first sprocket in an axial direction parallel to the rotational center axis of the bicycle rear sprocket assembly without another sprocket disposed between the first sprocket and the second sprocket. The first total number of the plurality of first circumferential areas minus the second total number of the plurality of second circumferential areas is equal to or larger than two. According to the second aspect of the present invention, a bicycle rear sprocket assembly is provided in which it is possible to reliably complete a shifting operation even when a total tooth number of a bicycle sprocket is an even number and the bicycle sprocket has a plurality of shifting facilitation areas.

In accordance with a third aspect of the present invention, the bicycle rear sprocket assembly according to the second aspect is configured so that the plurality of first sprocket teeth includes a neighboring tooth adjacent to the second shifting initiation tooth without another tooth between the second shifting initiation tooth and the neighboring tooth on the outer periphery of the first sprocket body in an upstream side of the driving rotational direction from the second shifting initiation tooth. The plurality of second sprocket teeth includes a chain-supporting tooth disposed between the second shifting initiation tooth and the neighboring tooth in a circumferential direction with respect to the rotational center axis when viewed from the axial direction. According to the third aspect of the present invention, a bicycle rear sprocket assembly is provided in which it is possible to smoothly complete the shifting operation in the second shifting facilitation area in addition to the first shifting facilitation area.

In accordance with a fourth aspect of the present invention, the bicycle rear sprocket assembly according to the third aspect is configured so that the chain-supporting tooth has a tooth height that is larger than those of the plurality of the second sprocket teeth. According to the fourth aspect of the present invention, a bicycle rear sprocket assembly is provided in which it is possible to smoothly complete the shifting operation in the second shifting facilitation area in addition to the first shifting facilitation area.

In accordance with a fifth aspect of the present invention, the bicycle rear sprocket assembly according to any one of the second to fourth aspects is configured so that the first shifting facilitation area and the second shifting facilitation area are configured to facilitate a shifting operation from the first sprocket to the second sprocket. According to the fifth aspect of the present invention, a bicycle rear sprocket assembly is provided in which it is possible to reliably complete a shifting operation from a larger sprocket to a smaller sprocket (i.e., an upshifting operation).

In accordance with a sixth aspect of the present invention, the bicycle rear sprocket assembly according to any one of the second to fifth aspects is configured so that the plurality of first sprocket teeth are configured to engage with a bicycle chain that includes a plurality of outer link plates and a plurality of inner link plates. The first shifting initiation tooth and the second shifting initiation tooth are configured to engage with a pair of outer link plates when the bicycle chain shifts from the first sprocket to the second sprocket. The outer link plates in each of the pairs of outer link plates face each other in the axial direction. According to the sixth aspect of the present invention, a bicycle rear sprocket assembly is provided in which it is possible to smoothly complete the shifting operation.

In accordance with a seventh aspect of the present invention, the bicycle rear sprocket assembly according to the sixth aspect is configured so that the bicycle chain is prevented from shifting from the first sprocket to the second sprocket when one of the first shifting initiation tooth and the second shifting initiation tooth engages with a pair of inner link plates. The inner link plates in each of the pairs of inner link plates face each other in the axial direction. According to the seventh aspect of the present invention, a bicycle rear sprocket assembly is provided in which it is possible to smoothly complete the shifting operation.

In accordance with an eighth aspect of the present invention, the bicycle rear sprocket assembly according to the third or fourth aspect is configured so that the chain supporting tooth has a recess on an axial facing surface facing the first sprocket. According to the eighth aspect of the present invention, a bicycle rear sprocket assembly is provided in which it is possible to smoothly complete the shifting operation.

In accordance with a ninth aspect of the present invention, the bicycle rear sprocket assembly according to the eighth aspect is configured so that a top surface of the recess is configured to contact a bicycle chain during an upshifting operation. According to the ninth aspect of the present invention, a bicycle rear sprocket assembly is provided in which it is possible to smoothly complete the shifting operation.

In accordance with a tenth aspect of the present invention, the bicycle rear sprocket assembly according to any one of the second to ninth aspects is configured so that the first sprocket further includes a third shifting facilitation area configured to facilitate a shifting operation from the second sprocket to the first sprocket. According to the tenth aspect of the present invention, a bicycle rear sprocket assembly is provided in which it is possible to reliably complete a shifting operation from a smaller sprocket to a larger sprocket (i.e., a downshifting operation).

In accordance with an eleventh aspect of the present invention, the bicycle rear sprocket assembly according to the tenth aspect is configured so that the third shifting facilitation area is partly overlapped with the first shifting facilitation area. According to the eleventh aspect of the present invention, a bicycle rear sprocket assembly is provided in which it is possible to increase a number of driving teeth even when a bicycle sprocket has an upshifting facilitation area and a downshifting facilitation area.

In accordance with a twelfth aspect of the present invention, a bicycle rear sprocket assembly is provided that basically comprises a first sprocket including a first sprocket body. A plurality of angular segments result from equally dividing the first sprocket body into an even-numbered and equal to or more than ten angular segments. A plurality of first sprocket teeth are provided to an outer periphery of the first sprocket body. The plurality of first sprocket teeth include a first shifting initiation tooth and a second shifting initiation tooth. The first shifting initiation tooth is entirely disposed in a first angular segment among the plurality of angular segments and the second shifting initiation tooth is entirely disposed in a second angular segment among the plurality of angular segments. A first total number of the plurality of angular segments is an even number. The first shifting initiation tooth is disposed in a first shifting facilitation area, and the second shifting initiation tooth is disposed in a second shifting facilitation area. A first angular segment counting number from the first angular segment to a third angular segment in a driving rotational direction with respect to a rotational center axis of the bicycle rear sprocket assembly is an odd number, A second angular segment counting number from the second angular segment to a fourth angular segment in the driving rotational direction is an odd number. The third angular segment is adjacent to the second angular segment without another angular segment between the second angular segment and the third angular segment in an upstream side of the driving rotational direction. The fourth angular segment is adjacent to the first angular segment without another angular segment between the first angular segment and the fourth angular segment in an upstream side of the driving rotational direction. The first angular segment counting number is different from the second angular segment counting number. According to the twelfth aspect of the present invention, a bicycle rear sprocket assembly is provided in which it is possible to reliably complete a shifting operation even when a total tooth number of a bicycle sprocket is an even number and the bicycle sprocket has a plurality of shifting facilitation areas.

In accordance with a thirteenth aspect of the present invention, the bicycle rear sprocket assembly according to the twelfth aspect is configured to include a second sprocket including a second sprocket body, and a plurality of angular segments resulting from equally dividing the second sprocket body into even-numbered and equal to or more than ten angular segments. A plurality of second sprocket teeth are provided to an outer periphery of the second sprocket body. A second total number of the plurality of angular segments is an even number and smaller than the first total number of the plurality of angular segments of the first sprocket. The second sprocket is adjacent to the first sprocket in an axial direction parallel to the rotational center axis of the bicycle rear sprocket assembly without another sprocket between the first sprocket and the second sprocket. The first total number of the plurality of angular segments of the first sprocket minus the second total number of the plurality of angular segments of the second sprocket is equal to or larger than two. According to the thirteenth aspect of the present invention, a bicycle rear sprocket assembly is provided in which it is possible to reliably complete a shifting operation even when a total tooth number of a bicycle sprocket is an even number and the bicycle sprocket has a plurality of shifting facilitation areas.

In accordance with a fourteenth aspect of the present invention, the bicycle rear sprocket assembly according to the thirteenth aspect is configured so that the first shifting facilitation area and the second shifting facilitation area are configured to facilitate a shifting operation from the first sprocket to the second sprocket. According to the fourteenth aspect of the present invention, a bicycle rear sprocket assembly is provided in which it is possible to reliably complete a shifting operation from a larger sprocket to a smaller sprocket (i.e., an upshifting operation).

In accordance with a fifteenth aspect of the present invention, the bicycle rear sprocket assembly according to the thirteenth aspect is configured so that the first sprocket further includes a third shifting facilitation area configured to facilitate a shifting operation from the second sprocket to the first sprocket. According to the fifteenth aspect of the present invention, a bicycle rear sprocket assembly is provided in which it is possible to reliably complete a shifting operation from a smaller sprocket to a larger sprocket (i.e., a downshifting operation).

Also other objects, features, aspects and advantages of the disclosed bicycle rear sprocket assembly will become apparent to those skilled in the art from the following detailed description, which, taken in conjunction with the annexed drawings, discloses exemplary embodiments of the bicycle rear sprocket assembly.

BRIEF DESCRIPTION OF THE DRAWINGS

Referring now to the attached drawings which form a part of this original disclosure:

FIG. 10 is a small sprocket side elevational view of a sixteen tooth sprocket of the bicycle rear sprocket assembly of FIG. 1;

FIG. 11 is a small sprocket side elevational view of a fourteen tooth sprocket of the bicycle rear sprocket assembly of FIG. 1;

FIG. 12 is a partial top plan view of a chain supporting tooth of the fourteen tooth sprocket of FIG. 11;

FIG. 13 is a small sprocket side elevational view of a twelve tooth sprocket of the bicycle rear sprocket assembly of FIG. 1;

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a bicycle rear sprocket assembly in accordance with the exemplary embodiments of the present invention can have a different number of sprockets.

Figure 1:
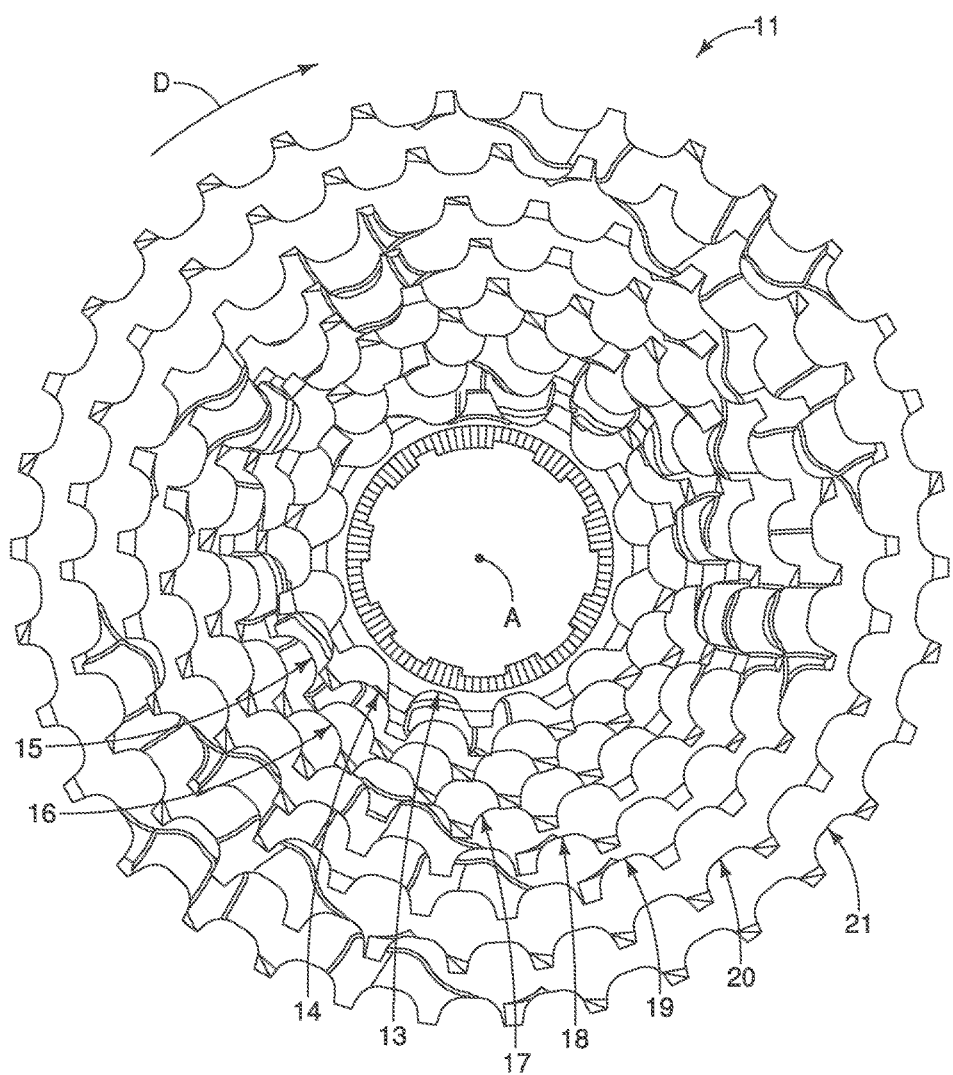
FIG. 1 is a side elevational view of a bicycle rear sprocket assembly in accordance with one illustrated embodiment.
Figure 2:
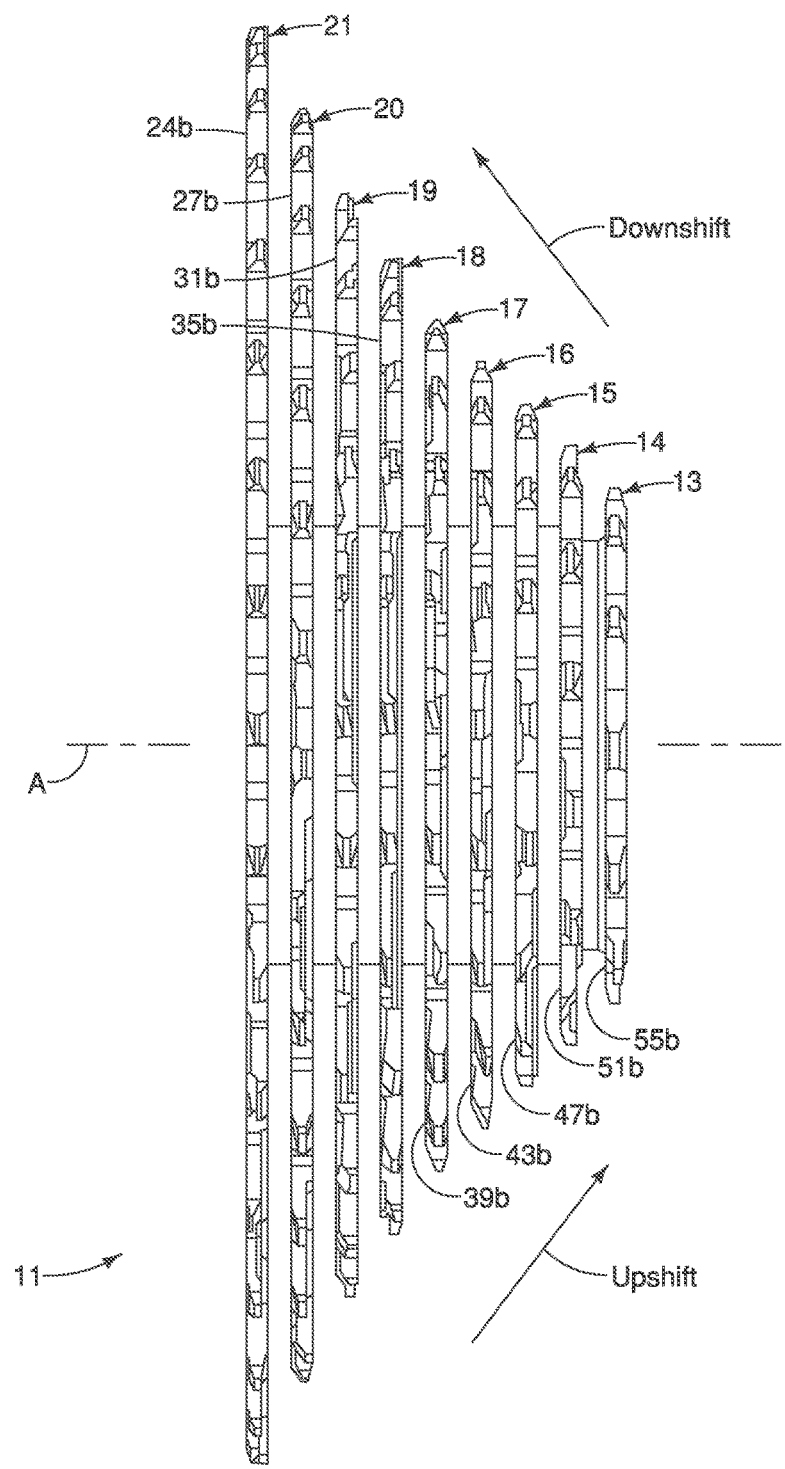
FIG. 2 is a rear devotional view of the bicycle rear sprocket assembly of FIG. 1.

Referring to FIGS. 1 to 24, a bicycle rear sprocket assembly 11 is illustrated in accordance with an exemplary embodiment of the present invention. As shown in FIGS. 1 and 2, the bicycle rear sprocket assembly 11 includes nine sprockets 13 to 21. The sprockets 13 to 21 are axially spaced from each other at predetermined intervals. The sprockets 13 to 21 are configured to be fixedly mounted on a bicycle rear hub assembly such that the sprockets 13 to 21 are configured to rotate together about a rotational center axis A. The sprockets 13 to 21 typically rotate together in a driving rotational direction D (e.g., in a clockwise direction as viewed in FIG. 1) when the rider is pedaling in a forward (clockwise) direction to propel the bicycle in a forward direction. It will be apparent to those skilled in the bicycle art from this disclosure that the rear sprocket assembly can have fewer or more sprockets.

As shown in FIGS. 1 and 2, the sprockets 13 to 21 are hard, rigid disc shaped members formed from a suitable material, such as a metallic material. In the illustrated exemplary embodiment, the sprockets 13 to 21 are each a one-piece, unitary member formed of a metallic material that is suitable for a bicycle sprocket. Referring to FIG. 2, the sprocket assembly 11 is illustrated with arrows showing the directions of an upshift operation and a downshift operation. An upshift operation occurs when a bicycle chain 23 (FIGS. 18 and 19) is moved from a large sprocket to the next smaller sprocket, while a downshift operation occurs when the bicycle chain 23 is moved from a small sprocket to the next larger sprocket. The sprockets 13 to 21 are designed so that the bicycle chain can execute smooth and reliable downshifting and upshifting motions. The sprockets 13 to 21 can include modified teeth, such as teeth having inclined surfaces, and/or recesses to facilitate the downshifting and upshifting operations, as described in detail below.

In the illustrated exemplary embodiment, the rear sprocket assembly 11 of the present invention has a tooth configuration of 12T-14T-16T-18T-20T-23T-26T-30T-34T for the sprockets 13 to 21, respectively. Of course, it will be apparent to those skilled in the bicycle art from this disclosure that the sprockets 13 to 21 can have other tooth configurations.

Basically, when the sprocket assembly 11 is rotated in a clockwise direction D as viewed in FIG. 1, inner and outer link plates 23a and 23b of a bicycle chain 23 (FIGS. 18 and 19) engage the teeth of one of the sprockets. In the case of a sprocket with an even number of teeth, such as sprockets 13 to 17 and 19 to 21, the inner and outer link plates 23a and 23b will always engage the same teeth. In the case of a sprocket with an odd number of teeth, the inner and outer link plates 23a and 23b will alternately engage different teeth with each rotation of the sprocket assembly 11. Therefore, the teeth of the sprocket 18 (having an odd number of teeth) will alternately engage both the inner and outer link plates 23a and 23b.

Figure 3:
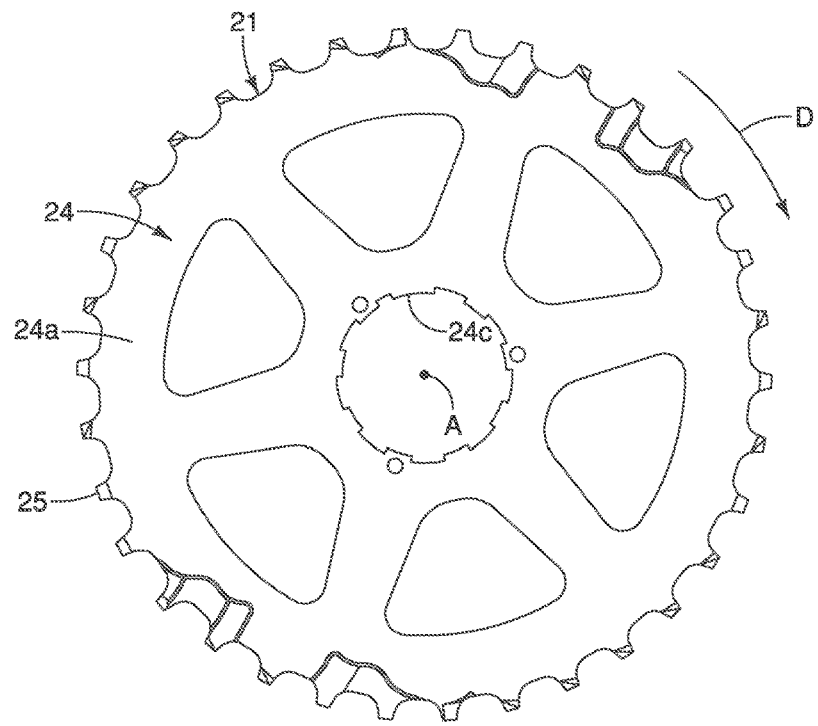
FIG. 3 is a small sprocket side elevational view of a thirty-four tooth sprocket of the bicycle rear sprocket assembly of FIG. 1.

Referring now to FIGS. 2 and 3, the sprocket 21 basically has a sprocket body 24 and a plurality (thirty-four) of circumferentially spaced teeth 25 extending radially and outwardly from an outer periphery of the sprocket body 24. The term "outer periphery of the sprocket body" as used herein lies on a circle that corresponds to the root diameter of teeth 25. The sprocket body 24 has a first axial side or small sprocket side 24a that faces the next smaller sprocket (sprocket 20) and a second axial side or large sprocket side 24b that faces the bicycle wheel. The center of the sprocket 21 is provided with a splined bore 24c that is mounted on the freewheel (not shown) of the bicycle rear hub assembly in a conventional manner.

Figure 4:
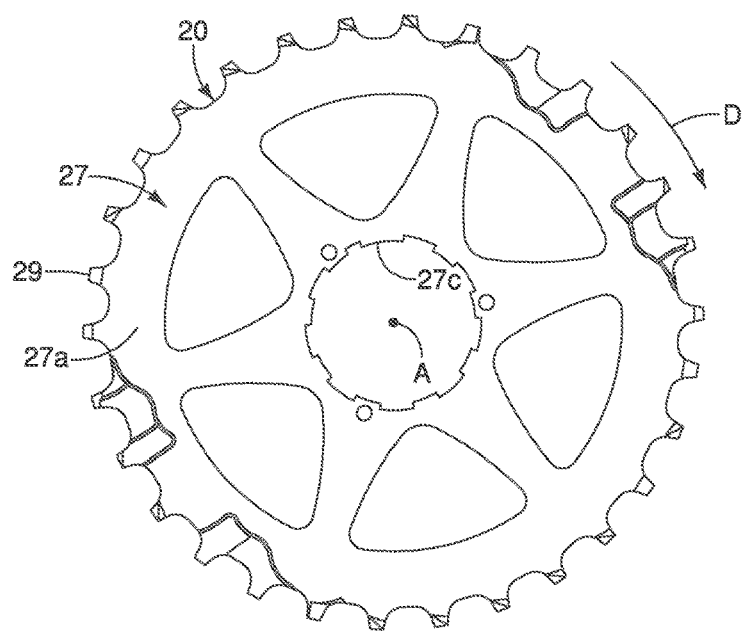
FIG. 4 is a small sprocket side elevational view of a thirty tooth sprocket of the bicycle rear sprocket assembly of FIG. 1.

Referring now to FIGS. 2 and 4, the sprocket 20 basically has a sprocket body 27 and a plurality (thirty) of circumferentially spaced teeth 29 extending radially and outwardly from an outer periphery of the sprocket body 27. The sprocket body 27 has a first axial side or small sprocket side 27a that faces the next smaller sprocket (sprocket 19) and a second axial side or large sprocket side 27b that faces the next larger sprocket (sprocket 21). The center of the sprocket 20 is provided with a splined bore 27c that is mounted on the freewheel (not shown) of the bicycle rear hub assembly in a conventional manner.

Figure 5:
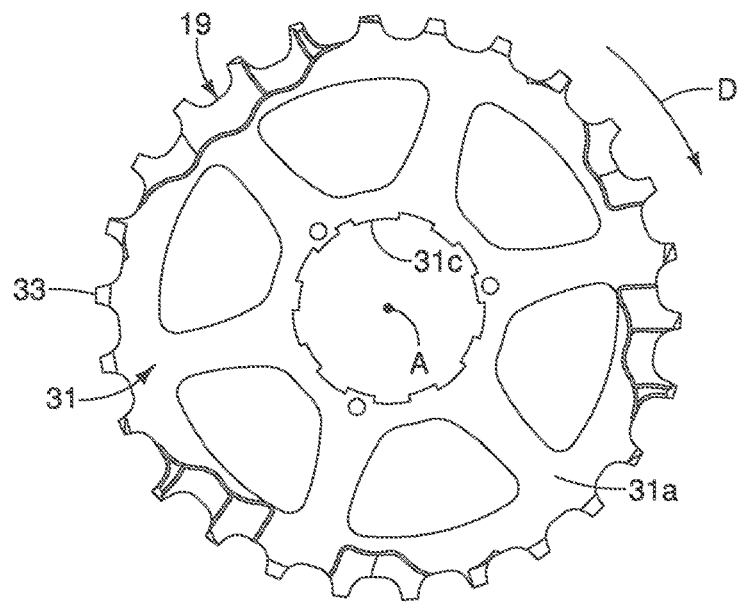
FIG. 5 is a small sprocket side elevational view of a twenty-six tooth sprocket of the bicycle rear sprocket assembly of FIG. 1.

Referring now to FIGS. 2 and 5, the sprocket 19 basically has a sprocket body 31 and a plurality (twenty-six) of circumferentially spaced teeth 33 extending radially and outwardly from an outer periphery of the sprocket body 31. The sprocket body 31 has a first axial side or small sprocket side 31a that faces the next smaller sprocket (sprocket 18) and a second axial side or large sprocket side 31b that faces the next larger sprocket (sprocket 20). The center of the sprocket 19 is provided with a splined bore 31c that is mounted on the freewheel (not shown) of the bicycle rear hub assembly in a conventional manner.

Figure 6:
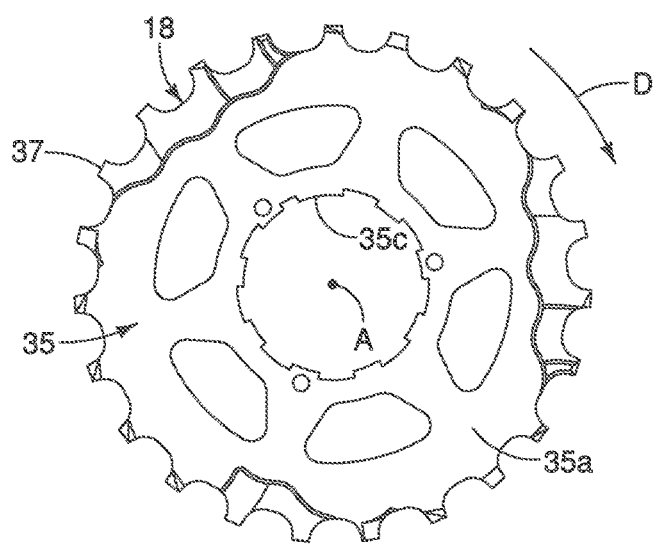
FIG. 6 is a small sprocket side elevational view of a twenty-three tooth sprocket of the bicycle rear sprocket assembly of FIG. 1.

Referring now to FIGS. 2 and 6, the sprocket 18 basically has a sprocket body 35 and a plurality (twenty-three) of circumferentially spaced teeth 37 extending radially and outwardly from an outer periphery of the sprocket body 35. The sprocket body 35 has a first axial side or small sprocket side 35a that faces the next smaller sprocket (sprocket 17) and a second axial side or large sprocket side 35b that faces the next larger sprocket (sprocket 19). The center of the sprocket 18 is provided with a splined bore 35c that is mounted on the freewheel (not shown) of the bicycle rear hub assembly in a conventional manner.

Figure 7:
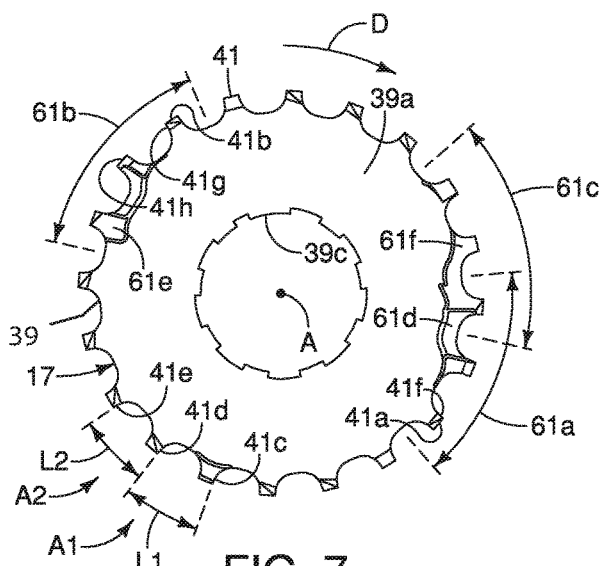
FIG. 7 is a small sprocket side elevational view of a twenty tooth sprocket of the bicycle rear sprocket assembly of FIG. 1.

Referring now to FIGS. 2 and 7, the sprocket 17 basically has a sprocket body 39 and a plurality (twenty) of circumferentially spaced teeth 41 extending radially and outwardly from an outer periphery of the sprocket body 39. The sprocket body 39 has a first axial side or small sprocket side 39a that faces the next smaller sprocket (sprocket 16) and a second axial side or large sprocket side 39b that faces the next larger sprocket (sprocket 18). The center of the sprocket 17 is provided with a splined bore 39c that is mounted on the freewheel (not shown) of the bicycle rear hub assembly in a conventional manner.

Figure 8:
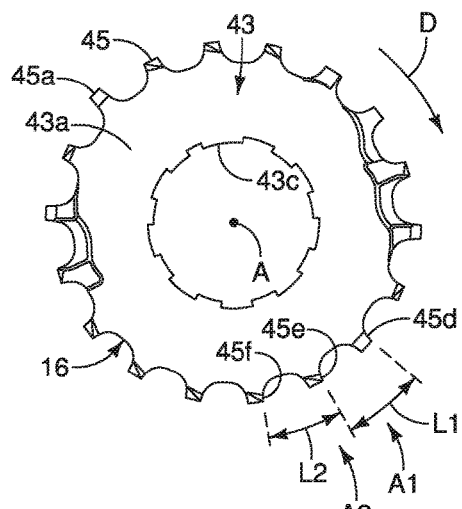
FIG. 8 is a small sprocket side elevational view of a eighteen tooth sprocket of the bicycle rear sprocket assembly of FIG. 1.

Referring now to FIGS. 2 and 8, the sprocket 16 basically has a sprocket body 43 and a plurality (eighteen) of circumferentially spaced teeth 45 extending radially and outwardly from an outer periphery of the sprocket body 43. The sprocket body 43 has a first axial side or small sprocket side 43a that faces the next smaller sprocket (sprocket 15) and a second axial side or large sprocket side 43b that faces the next larger sprocket (sprocket 17). The center of the sprocket 16 is provided with a splined bore 43c that is mounted on the freewheel (not shown) of the bicycle rear hub assembly in a conventional manner.

Referring now to FIGS. 2 and 10, the sprocket 15 basically has a sprocket body 47 and a plurality (sixteen) of circumferentially spaced teeth 49 extending radially and outwardly from an outer periphery of the sprocket body 47. The sprocket body 47 has a first axial side or small sprocket side 47a that faces the next smaller sprocket (sprocket 14) and a second axial side or large sprocket side 47b that faces the next larger sprocket (sprocket 16). The center of the sprocket 15 is provided with a splined bore 47c that is mounted on the freewheel (not shown) of the bicycle rear hub assembly in a conventional manner.

Referring now to FIGS. 2 and 11, the sprocket 14 basically has a sprocket body 51 and a plurality (fourteen) of circumferentially spaced teeth 53 extending radially and outwardly from an outer periphery of the sprocket body 51. The sprocket body 51 has a first axial side or small sprocket side 51a that faces the next smaller sprocket (sprocket 13) and a second axial side or large sprocket side 51b that faces the next larger sprocket (sprocket 15). The center of the sprocket 14 is provided with a splined bore 51c that is mounted on the freewheel (not shown) of the bicycle rear hub assembly in a conventional manner.

Referring now to FIGS. 2 and 13, the sprocket 13 basically has a sprocket body 55 and a plurality (twelve) of circumferentially spaced teeth 57 extending radially and outwardly from an outer periphery of the sprocket body 55. The sprocket body 55 has a first axial side or small sprocket side 55a that faces in a bicycle outboard direction and a second axial side or large sprocket side 55b that faces the next larger sprocket (sprocket 14). The center of the sprocket 13 is provided with a splined bore 55c that is mounted on the freewheel (not shown) of the bicycle rear huh assembly in a conventional manner.

The bicycle rear sprocket assembly 11 includes a first sprocket, such as the sprocket 15 shown in FIG. 10. The sprocket 15 includes the sprocket body 47 and the plurality of sprocket teeth 49 provided to an outer periphery of the sprocket body 47. The plurality of sprocket teeth 49 include a first shifting initiation tooth 49a and a second shifting initiation tooth 49b. The first shifting initiation tooth 49a is disposed in a first shifting facilitation area 59a. The second shifting initiation tooth 49b is disposed in a second shifting facilitation area 59b. The sprocket 15 can further include a third shifting facilitation area 59c. The third shifting facilitation area 59c partly overlaps with the first shifting facilitation area 59a, as shown in FIG. 10.

The first shifting facilitation area 59a and the second shifting facilitation area 59b are configured to facilitate a shifting operation from the sprocket 15 (i.e., the first sprocket) to the sprocket 14 (i.e, the second sprocket). Accordingly, the first and second shifting facilitation areas 59a and 59b facilitate an upshifting operation. As shown in FIG. 10, the first and second shifting facilitation areas 59a and 59b are not diametrically opposed, i.e., a line passing through the center of the first shifting facilitation area 59a and the rotational center axis A does not pass through the center of the second shifting facilitation area 59b. The third shifting facilitation area 59c is configured to facilitate a shifting operation from the sprocket 14 (i.e., the second sprocket) to the sprocket 15 (i.e., the first sprocket). Accordingly, the third shifting facilitation area 59c facilitates a downshifting operation. Each of the first to third shifting facilitation areas 59a to 59c includes an axially recessed portion, 59d to 59f, respectively.

The axially recessed portions 59d and 59e are upshifting recessed portions, and the axially recessed portion 59f is a downshifting recessed portion. The upshifting recessed portions 59d and 59e are configured to reduce interference between the bicycle chain 23 and the sprocket 15 during upshifting from the sprocket 15 to the sprocket 14. The downshifting recess portion 59f is configured to reduce interference between the bicycle chain 23 and the bicycle sprocket 15 during downshifting from the sprocket 14 to the sprocket 15. Each of the upshifting recessed portion 59d and 59e and the downshifting recessed portion 59f are provided on the first axial side 47a of the sprocket body 47.

The sprocket 15 has a plurality of circumferential areas. Each circumferential area has a circumferential length that corresponds to a single tooth pitch defined from a driving surface of a tooth of the sprocket teeth to a driving surface of an adjacent tooth of the sprocket teeth. The adjacent tooth is the tooth adjacent to the tooth without another tooth of the sprocket 15 therebetween. For example, a first circumferential length L1 shown in FIG. 10 extends from the driving surface 49c of a tooth to the driving surface 49d of the adjacent tooth, and corresponds to the first circumferential area A1. A second circumferential length L2 extends from the driving surface 49d of the adjacent tooth to the driving surface 49e of the next adjacent tooth, and corresponds to a second circumferential area A2. However, when the adjacent tooth having the driving surface 49e is absent, such as to provide a gap between sprocket teeth, the circumferential length is still L2 as shown because the circumferential length is based on the single tooth pitch and not only on the distance between driving surfaces of adjacent teeth. Accordingly, the sprocket 15 has sixteen circumferential lengths L, and thus sixteen circumferential areas A. Accordingly, the total number of the plurality of circumferential areas for the sprocket 15 is an even number.

A first circumferential area counting number from the driving surface 49f of the first shifting initiation tooth 49a to the driving surface 49g of the second shifting initiation tooth 49h in the driving rotational direction D with respect to a rotational center axis A of the bicycle rear sprocket assembly 11 is an odd number. As shown in FIG. 10, the first circumferential area counting number for the sprocket 15 from the driving surface 49f of the first shifting initiation tooth 49a to the driving surface 49g of the second shifting initiation tooth 49b in the driving rotational direction D with respect to the rotational center axis A of the bicycle rear sprocket assembly 11 is nine. A second circumferential area counting number from the driving surface 49g of the second shifting initiation tooth 49h to the driving surface 49f of the first shifting initiation tooth 49a in the driving rotational direction D with respect to a rotational center axis A of the bicycle rear sprocket assembly 11 is an odd number. As shown in FIG. 10, the second circumferential area counting number for the sprocket 15 from the driving surface 49g of the second shifting initiation tooth 49b to the driving surface 49f of the first shifting initiation tooth 49a in the driving rotational direction D with respect to the rotational center axis A of the bicycle rear sprocket assembly 11 is seven. The first circumferential area counting number for the sprocket 15 (i.e., the first sprocket) is nine, and the second circumferential area counting number is seven. Accordingly, the first circumferential area counting number is different from the second circumferential area counting number for the sprocket 15 (i.e., the first sprocket).

The bicycle rear sprocket assembly 11 further includes a second sprocket, such as the sprocket 14 shown in FIG. 11. The sprocket 14 (i.e., the second sprocket) is adjacent the sprocket 15 (i.e., the first sprocket) in an axial direction parallel to the rotational center axis A. of the bicycle rear sprocket assembly 11 without another sprocket disposed between the sprocket 15 and the sprocket 14. As shown in FIGS. 1 and 2, the sprocket 14 is disposed on an outbound facing side 47a of the sprocket 15 without another sprocket disposed therebetween.

Figure 14:
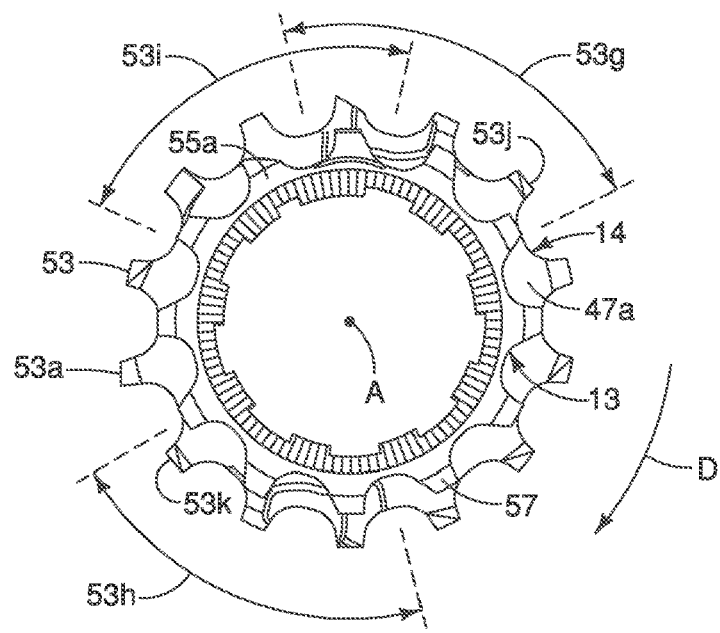
FIG. 14 is a small sprocket side devotional view of the twelve tooth sprocket and the fourteen tooth sprocket coupled together.
Figure 15:
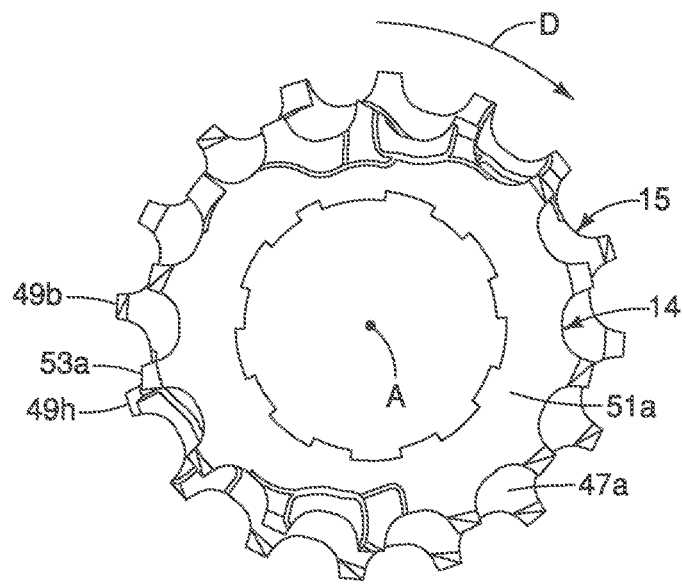
FIG. 15 is a small sprocket side elevational view of the fourteen tooth sprocket and the sixteen tooth sprocket coupled together.
Figure 18:
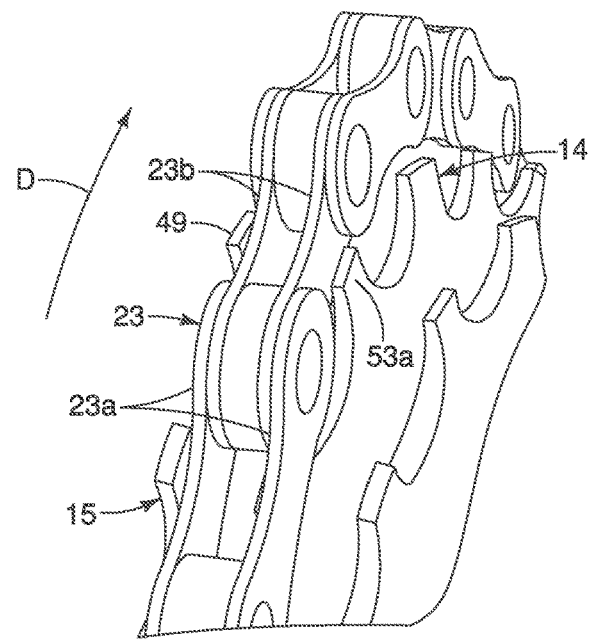
FIG. 18 is a perspective view of a bicycle chain during a downward shifting operation.
Figure 19:
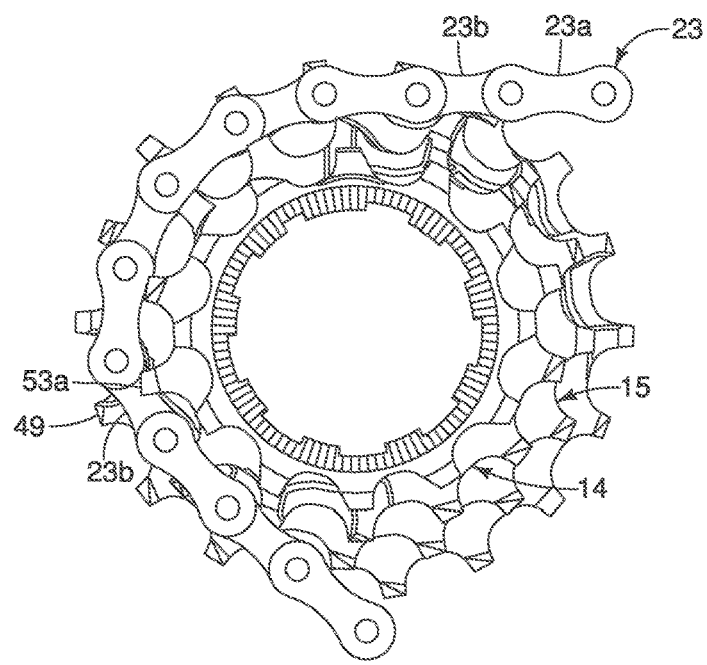
FIG. 19 is small sprocket side elevational view of the bicycle chain during the downward shifting operation illustrated in FIG. 18.
Figure 22:
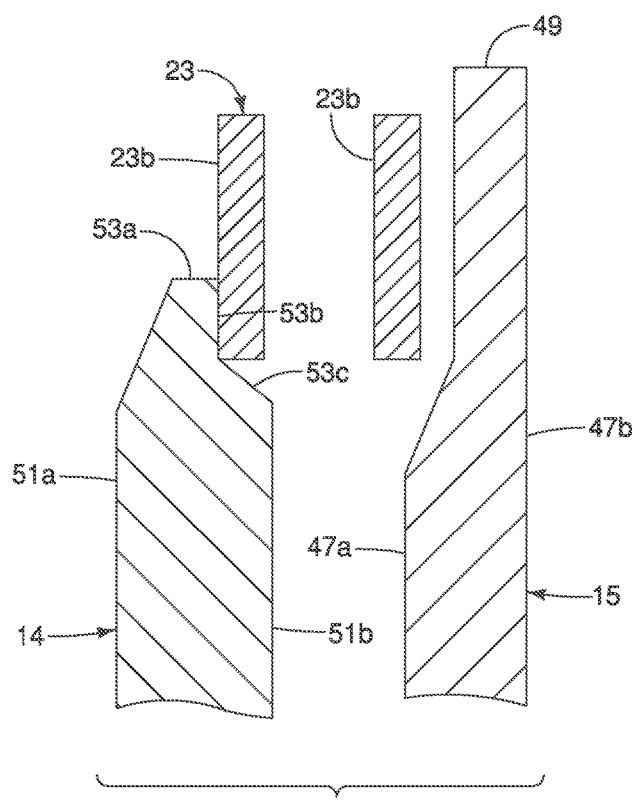
FIG. 22 is a front elevational view in cross section of the chain supporting tooth of FIG. 20 supporting a bicycle chain.

The sprocket 14 includes the sprocket body 51 and a plurality of sprocket teeth 53 provided to an outer periphery of the sprocket body 51, as shown in FIG. 11. The plurality of sprocket teeth 53 includes a chain-supporting tooth 53a disposed between the second shifting initiation tooth 49h and the neighboring tooth 49h in a circumferential direction with respect to the rotational center axis A when viewed from the axial direction, as shown in FIG. 15. The chain-supporting tooth 53a has a tooth height that is larger than those of the plurality of the second sprocket teeth, i.e., the chain supporting tooth 53a has the largest tooth height of the plurality of teeth 53 of the sprocket 14 (i.e., the second sprocket), as shown in FIGS. 11, 14 and 15. The chain supporting tooth 53a has a recess 53b on an axial facing surface 51b facing the sprocket 15 (i.e., the first sprocket), as shown in FIGS. 12 and 22. A top surface 53c of the recess 53b is configured to contact the bicycle chain 23 during an upshifting operation, as shown in FIG. 22. During shifting of the chain 23 from the sprocket 15 to the sprocket 14, the top surface 53c of the chain supporting tooth 53a supports the chain 23 to facilitate a smooth and reliable upshifting operation. The pair of inner link plates 23b are disposed between a tooth 49 of the sprocket 15 and the chain supporting tooth 53a during the upshifting operation, as shown in FIGS. 18, 19 and 22, and the pair of inner link plates 23b are supported by the chain supporting tooth 53a.

The sprocket 14 has a plurality of circumferential areas. Each circumferential area has a circumferential length that corresponds to a single tooth pitch defined from a driving surface of a tooth of the sprocket teeth 53 to a driving surface of an adjacent tooth of the sprocket teeth 53. The adjacent tooth is the tooth adjacent to the tooth without another tooth of the sprocket 14 therebetween. For example, a first circumferential length L1 shown in FIG. 11 extends from a driving surface 53d of a sprocket tooth to a driving surface 53e of the adjacent tooth. A second circumferential length L2 extends from the driving surface 53e of the sprocket tooth to the driving surface 53f of the adjacent tooth. Accordingly, the sprocket 14 (i.e., the second sprocket) has fourteen circumferential lengths, and thus fourteen circumferential areas. Accordingly, the total number of the plurality of circumferential areas for the sprocket 14 is an even number. The total number of the plurality of circumferential areas for the sprocket 14 (i.e., the second sprocket) is smaller than the total number of the plurality of circumferential areas for sprocket 15 (i.e., the first sprocket). The total number of the plurality of circumferential areas of the sprocket 15 minus the total number of the plurality of circumferential areas for the sprocket 14 is equal to or larger than two (i.e., 16−14=2).

The sprocket 14 has a first shifting facilitation area 53g and a second shifting facilitation area 53h configured to facilitate a shifting operation from the sprocket 14 to the sprocket 13, as shown in FIG. 14. Accordingly, the first and second shifting facilitation areas 53g and 53h facilitate an upshifting operation. As shown in FIG. 14, the first and second shifting facilitation areas 53g and 53h are diametrically opposed, i.e., a line passing through the center of the first shifting facilitation area 53g and the rotational center axis A passes through the center of the second shifting facilitation area 53h. A third shifting facilitation area 53i is configured to facilitate a shifting operation from the sprocket 13 to the sprocket 14. The third shifting facilitation area 53i partly overlaps with the first shifting facilitation area 53g. A first shifting initiation tooth 53j is entirely disposed in the first shifting facilitation area 53g. A second shifting initiation tooth 53k is entirely disposed in a second shifting facilitation area 53h. The chain-supporting tooth 53a is entirely disposed outside of first, second and third shifting facilitation areas 53a, 53h and 53i.

The sprocket 15 (i.e., the first sprocket) and the sprocket 14 (i.e., the second sprocket) are shown coupled together in FIG. 15. The plurality of sprocket teeth 49 of the sprocket 15 includes a neighboring tooth 49h adjacent to the second shifting initiation tooth 49b without another tooth between the second shifting initiation tooth 49b and the neighboring tooth 49h on the outer periphery of the sprocket body 47 in an upstream side of the driving rotational direction from the second shifting initiation tooth 49b.

Figure 20:
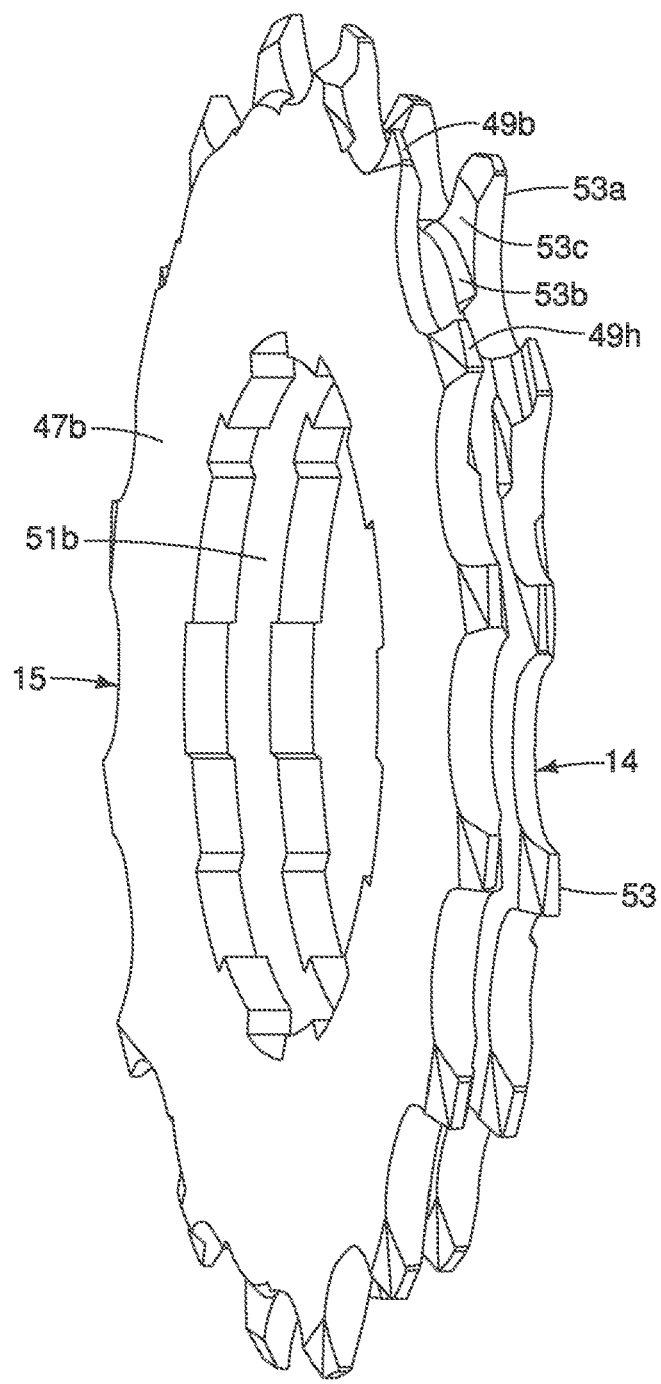
FIG. 20 is a large sprocket side perspective view of a chain supporting tooth of the fourteen tooth sprocket.
Figure 21:
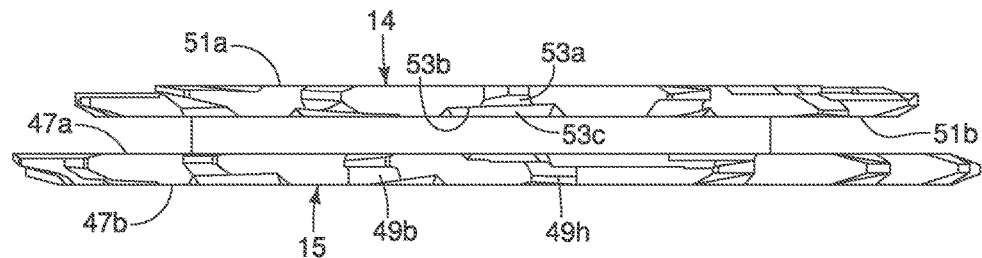
FIG. 21 is a top plan view of the chain supporting tooth of FIG. 20.

The plurality of sprocket teeth 53 of the sprocket 14 (i.e., the second sprocket) includes a chain-supporting tooth 53a disposed between the second shifting initiation tooth 49b and the neighboring tooth 49h in a circumferential direction with respect to the rotational center axis when viewed from the axial direction. As shown in FIGS. 15, 20 and 21, the chain-supporting tooth 53a of the sprocket 14 is disposed between the second shifting initiation tooth 49b and the neighboring tooth 49h of the sprocket 15 in the circumferential direction with respect to the rotational center axis A when viewed from the axial direction.

The plurality of sprocket teeth 49 of the sprocket 15 (i.e., the first sprocket) are configured to engage with the bicycle chain 23 that includes a plurality of outer link plates 23a and a plurality of inner link plates 23b, as shown in FIGS. 18 and 19. The first shifting initiation tooth 49a and the second shifting initiation tooth 49b are configured to engage with a pair of outer link plates 23a when the bicycle chain 23 shifts from the sprocket 15 (i.e., the first sprocket) to the sprocket 14 (i.e., the second sprocket). The outer link plates 23a in each pair face each other in the axial direction. The bicycle chain 23 is prevented from shifting from the sprocket 15 to the sprocket 14 when one of the first shifting initiation tooth and the second shifting initiation tooth engages with a pair of inner link plates 23b. The inner link plates 23b in each pair face each other in the axial direction.

The sprocket 17 includes the sprocket body 39 and the plurality of sprocket teeth 41 provided to an outer periphery of the sprocket body 39, as shown in FIG. 7. The plurality of sprocket teeth 41 include a first shifting initiation tooth 41a and a second shifting initiation tooth 41b. The first shifting initiation tooth 41a is disposed in a first shifting facilitation area 61a, The second shifting initiation tooth 41b is disposed in a second shifting facilitation area 61b. The sprocket 17 can further include a third shifting facilitation area 61c. The third shifting facilitation area 61c partly overlaps with the first shifting facilitation area 61a, as shown in FIG. 7.

The first shifting facilitation area 61a and the second shifting facilitation area 61b are configured to facilitate a shifting operation from the sprocket 17 to the sprocket 16. Accordingly, the first and second shifting facilitation areas 61a and 61b facilitate an upshifting operation. As shown in FIG. 7, the first and second shifting facilitation areas 61a and 61b are not diametrically opposed, i.e., a line passing through the center of the first shifting facilitation area 61a and the rotational center axis A does not pass through the center of the second shifting facilitation area 61b. The third shifting facilitation area 61c is configured to facilitate a shifting operation from the sprocket 16 to the sprocket 17. Accordingly, the third shifting facilitation area 61c facilitates a downshifting operation. Each of the first to third shifting facilitation areas 61a to 61e includes an axially recessed portion, 61d to 61f, respectively.

The axially recessed portions 61d and 61e are upshifting recessed portions, and the axially recessed portion 61f is a downshifting recessed portion. The upshifting recessed portions 61d and 61e are configured to reduce interference between the bicycle chain 23 and the sprocket 17 during upshifting from the sprocket 17 to the sprocket 16. The downshifting recess portion 61f is configured to reduce interference between the bicycle chain 23 and the bicycle sprocket 17 during downshifting from the sprocket 16 to the sprocket 17. Each of the upshifting recessed portion 61d and 61e and the downshifting recessed portion 61f are provided on the first axial side 39a of the sprocket body 39.

The sprocket 17 has a plurality of circumferential areas A. Each circumferential area A has a circumferential length L that corresponds to a single tooth pitch defined from a driving surface of a tooth of the sprocket teeth to a driving surface of an adjacent tooth of the sprocket teeth. The adjacent tooth is the tooth adjacent to the tooth without another tooth of the sprocket 17 therebetween. For example, a first circumferential length L1 shown in FIG. 7 extends from the driving surface 41c of a tooth to the driving surface 41d of the adjacent tooth, and corresponds to the first circumferential area A1. A second circumferential length L2 extends from the driving surface 41d of the adjacent tooth to the driving surface 41e of the next adjacent tooth, and corresponds to a second circumferential area A2. However, when the adjacent tooth having the driving surface 41e is absent, such as to provide a gap between sprocket teeth, the circumferential length is still L2 as shown because the circumferential length is based on the single tooth pitch and not only on the distance between driving surfaces of adjacent teeth. Accordingly, the sprocket 17 has twenty circumferential lengths L, and thus twenty circumferential areas A. Accordingly, the total number of the plurality of circumferential areas for sprocket 17 is an even number.

A first circumferential area counting number from the driving surface 41f of the first shifting initiation tooth 41a to the driving surface 41g of the second shifting initiation tooth 41b in the driving rotational direction D with respect to a rotational center axis A of the bicycle rear sprocket assembly 11 is an odd number. As shown in FIG. 7, the first circumferential area counting number for the sprocket 17 from the driving surface 41f of the first shifting initiation tooth 41a to the driving surface 41g of the second shifting initiation tooth 41b in the driving rotational direction D with respect to the rotational center axis A of the bicycle rear sprocket assembly 11 is eleven. A second circumferential area counting number from the driving surface 41g of the second shifting initiation tooth 41b to the driving surface 41f of the first shifting initiation tooth 41a in the driving rotational direction D with respect to a rotational center axis A of the bicycle rear sprocket assembly 11 is an odd number. As shown in FIG. 7, the second circumferential area counting number for the sprocket 17 from the driving surface 41g of the second shifting initiation tooth 41b to the driving surface 41f of the first shifting initiation tooth 41a in the driving rotational direction D with respect to the rotational center axis A of the bicycle rear sprocket assembly 11 is nine. The first circumferential area counting number for the sprocket 17 is eleven, and the second circumferential area counting number is nine. Accordingly, the first circumferential area counting number is different from the second circumferential area counting number for the sprocket 17.

The sprocket 16 is adjacent the sprocket 17 in an axial direction parallel to the rotational center axis A of the bicycle rear sprocket assembly 11 without another sprocket disposed between the sprocket 17 and the sprocket 16. As shown in FIGS. 1 and 2, the sprocket 16 is disposed on an outbound facing side 39a of the sprocket 17 without another sprocket disposed therebetween.

Figure 9:
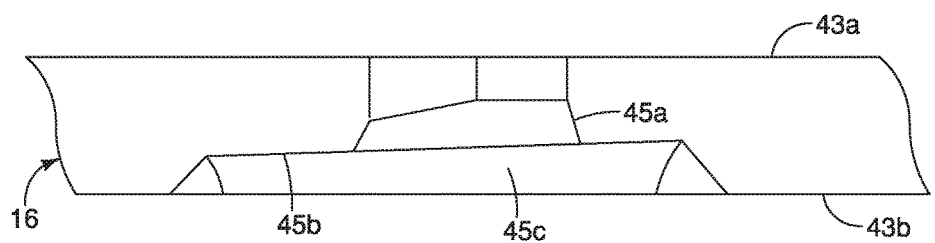
FIG. 9 is a partial top plan view of a chain supporting tooth of the eighteen tooth sprocket of FIG. 8.
Figure 16:
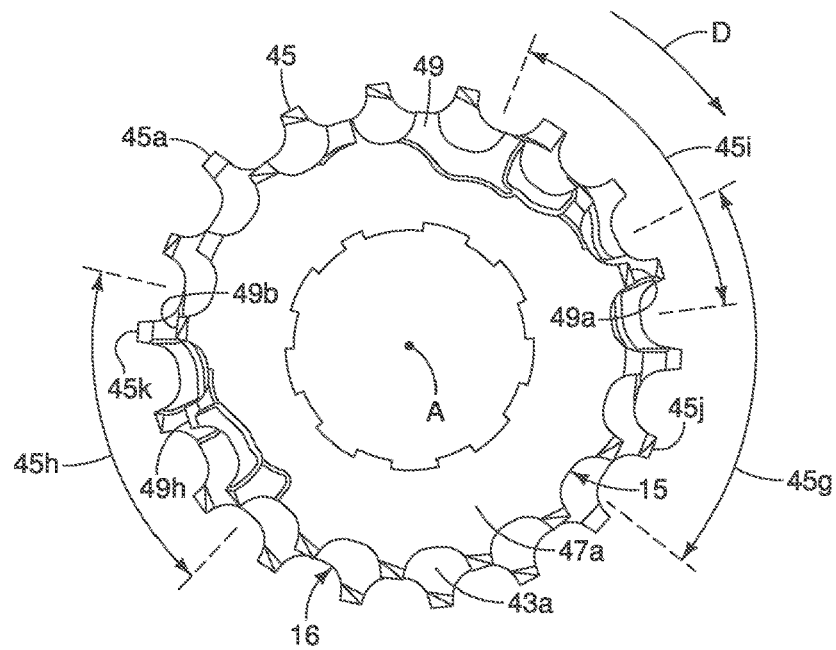
FIG. 16 is a small sprocket side devotional view of the sixteen tooth sprocket and the eighteen tooth sprocket coupled together.
Figure 17:
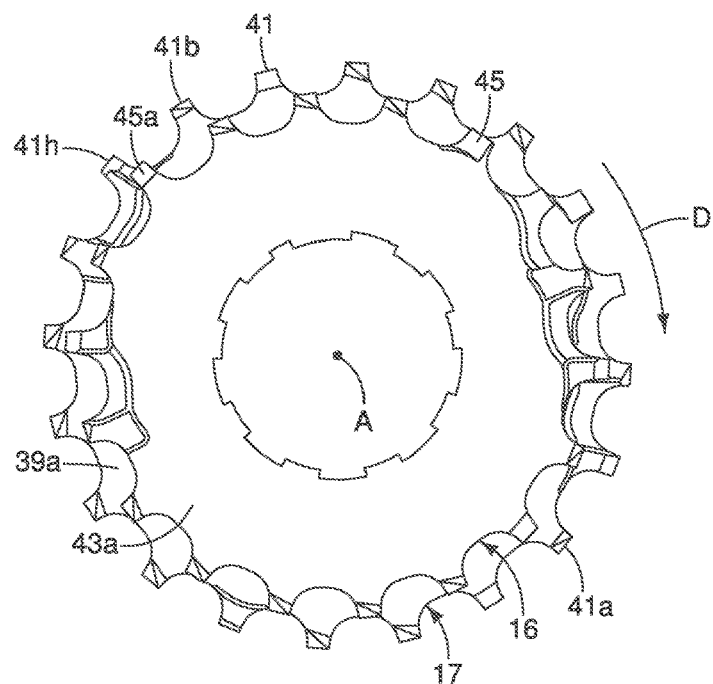
FIG. 17 is a small sprocket side elevational view of the eighteen tooth sprocket and the twenty tooth sprocket coupled together.

The sprocket 16 includes the sprocket body 43 and a plurality of sprocket teeth 45 provided to an outer periphery of the sprocket body 43, as shown in FIG. 8. The plurality of sprocket teeth 45 includes a chain-supporting tooth 45a disposed between the second shifting initiation tooth 41b and the neighboring tooth 41h in a circumferential direction with respect to the rotational center axis A when viewed from the axial direction, as shown in FIG. 17. The chain-supporting tooth 45a has a tooth height that is larger than those of the plurality of the sprocket teeth, i.e., the chain supporting tooth 45a has the largest tooth height of the plurality of teeth 45 of the sprocket 16, as shown in FIGS. 8, 16 and 17. The chain supporting tooth 45a has a recess 45b on an axial facing surface 43h facing the sprocket 17, as shown in FIG. 9. A top surface 45c of the recess 45b is configured to contact the bicycle chain 23 during an upshifting operation.

The sprocket 16 has a plurality of circumferential areas. Each circumferential area has a circumferential length that corresponds to a single tooth pitch defined from a driving surface of a tooth of the sprocket teeth 45 to a driving surface of an adjacent tooth of the sprocket teeth 45. The adjacent tooth is the tooth adjacent to the tooth without another tooth of the sprocket 16 therebetween. For example, a first circumferential length L1 shown in FIG. 8 extends from a driving surface 45d of a sprocket tooth to a driving surface 45e of the adjacent tooth. A second circumferential length L2 extends from the driving surface 45e of the sprocket tooth to the driving surface 45f of the adjacent tooth. Accordingly, the sprocket 16 has eighteen circumferential lengths, and thus eighteen circumferential areas. Accordingly, the total number of the plurality of circumferential areas for the sprocket 16 is an even number. The total number of the plurality of circumferential areas for the sprocket 16 is smaller than the total number of the plurality of circumferential areas for the sprocket 17. The total number of the plurality of circumferential areas of the sprocket 17 minus the total number of the plurality of circumferential areas for the sprocket 16 is equal to or larger than two (i.e., 20−18=2).

The sprocket 16 has a first shifting facilitation area 45g and a second shifting facilitation area 45h configured to facilitate a shifting operation from the sprocket 16 to the sprocket 15, as shown in FIG. 16. Accordingly, the first and second shifting facilitation areas 45g and 45h facilitate an upshifting operation. As shown in FIG. 16, the first and second shifting facilitation areas 45g and 45h are diametrically opposed, i.e., a line passing through the center of the first shifting facilitation area 45g and the rotational center axis A passes through the center of the second shifting facilitation area 45h. A third shifting facilitation area 45i is configured to facilitate a shifting operation from the sprocket 15 to the sprocket 16. The third shifting facilitation area 45i partly overlaps with the first shifting facilitation area 45g. A first shifting initiation tooth 45j is entirely disposed in the first shifting facilitation area 45g. A second shifting initiation tooth 45k is entirely disposed in the second shifting facilitation area 45h. The chain-supporting tooth 45a is entirely disposed outside of first, second and third shifting facilitation areas 45g, 45h and 45i.

The sprocket 17 and the sprocket 16 are shown coupled together in FIG. 17. The plurality of sprocket teeth 41 of the sprocket 17 includes a neighboring tooth 41h adjacent to the second shifting initiation tooth 41b without another tooth between the second shifting initiation tooth 41b and the neighboring tooth 41h on the outer periphery of the sprocket body 39 in an upstream side of the driving rotational direction from the second shifting initiation tooth 41b.

The plurality of sprocket teeth 45 of the sprocket 16 includes the chain-supporting tooth 45a disposed between the second shifting initiation tooth 41b and the neighboring tooth 41h in a circumferential direction with respect to the rotational center axis when viewed from the axial direction. As shown in FIG. 17, the chain-supporting tooth 45a of the sprocket 16 is disposed between the second shifting initiation tooth 41b and the neighboring tooth 41h of the sprocket 17 in the circumferential direction with respect to the rotational center axis A when viewed from the axial direction.

The remaining sprockets having an even number of sprocket teeth can be similarly configured as described above. A description thereof is omitted herein for brevity.

Figure 23:
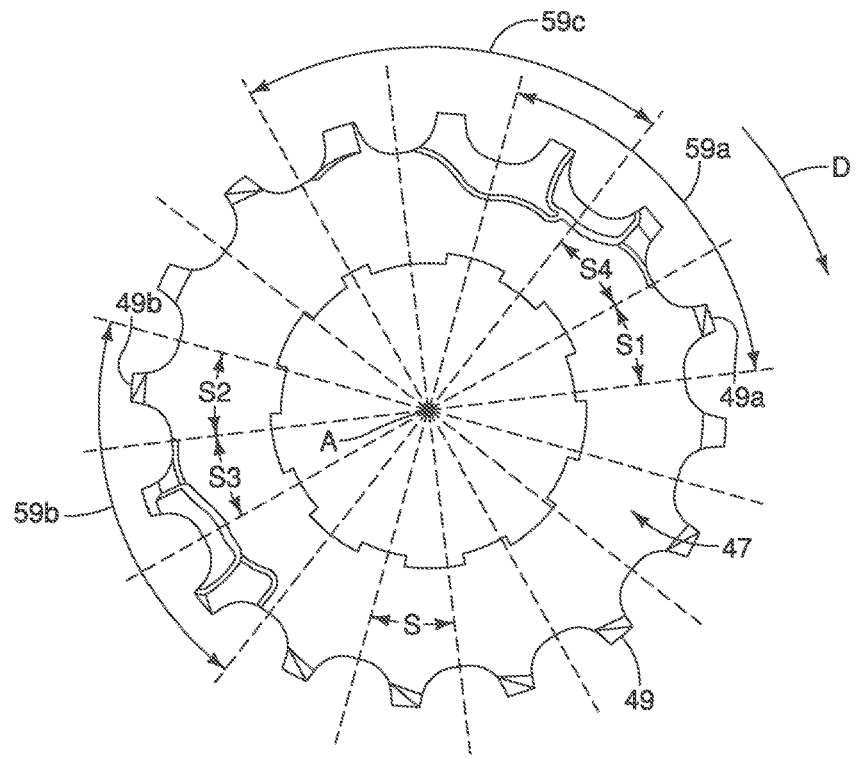
FIG. 23 is a small sprocket side elevational view of the sixteen tooth sprocket divided into sixteen angular segments.
Figure 24:
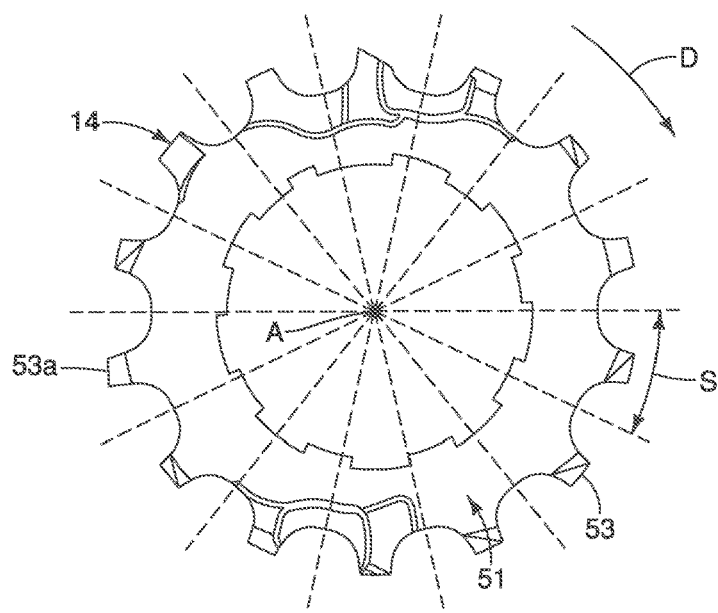
FIG. 24 is a small sprocket side elevational view of the fourteen tooth sprocket divided into fourteen angular segments.

Referring to FIGS. 23 and 24, the sprockets 15 and 14 are divided into a plurality of angular segments. Each angular segment is formed by equally dividing the sprocket into an even-numbered and equal to or more than ten angular segments. The configurations of the sprockets 15 and 14 are substantially identical as described above, except for being divided into angular segments (instead of circumferential areas), such that a repetitive description thereof is omitted.

As shown in FIG. 23, the sprocket 15 (i.e., the first sprocket) has a plurality of angular segments S resulting from equally dividing the sprocket body 47 into even-numbered and equal to or more than ten segments. The sprocket 15 has sixteen angular segments. Accordingly, a first total number of the plurality of angular segments S of the sprocket 15 is an even number.

The first shifting initiation tooth 49a is entirely disposed in a first angular segment S1 among the plurality of angular segments, as shown in FIG. 23. The second shifting initiation tooth 49b is entirely disposed in a second angular segment S2 among the plurality of angular segments. The first angular segment S1 is not diametrically opposite the second angular segment S2.

A third angular segment S3 is adjacent to the second angular segment S2 without any angular segments between the second angular segment S2 and the third angular segment S3 in an upstream side of the driving rotational direction D. A fourth angular segment S4 is adjacent to the first angular segment S1 without any angular segments between the first angular segment S1 and the fourth angular segment S4 in an upstream side of the driving rotational direction D. The third angular segment S3 is not diametrically opposite the fourth angular segment S4.

A first angular segment counting number from the first angular segment S1 to the third angular segment S3 in a driving rotational direction D with respect to a rotational center axis A of the bicycle rear sprocket assembly 11 is an odd number. As shown in FIG. 23, the first angular segment counting number is nine. A second angular segment counting number from the second angular segment S2 to the fourth angular segment S4 in the driving rotational direction is an odd number. The second angular segment counting number is seven. Accordingly, the first angular segment counting number (nine) is different from the second angular segment counting number (seven).

As shown in FIG. 24, the sprocket 14 (i.e., the second sprocket) has a plurality of angular segments S resulting from equally dividing the sprocket body 51 into even-numbered and equal to or more than ten angular segments S. A second total number of the plurality of angular segments S is an even number and smaller than the first total number of the plurality of angular segments of the sprocket 15 (i.e., the first sprocket). The second total number of angular segments of the sprocket 14 is fourteen. Accordingly, the second total number of angular segments is an even number that is smaller than the first total number of angular segments of the sprocket 15 (sixteen angular segments). The first total number of the plurality of angular segments of the sprocket 15 (i.e., the first sprocket) minus the second total number of the plurality of angular segments of the sprocket 14 (i.e., the second sprocket) is equal to or larger than two (i.e., 16−14=2).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle rear sprocket assembly. Accordingly, these directional terms, as utilized to describe the bicycle rear sprocket assembly should be interpreted relative to a bicycle in an upright riding position on a horizontal surface and that is equipped with the bicycle rear sprocket assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A bicycle rear sprocket assembly comprising:
a first sprocket and a second sprocket, the second sprocket being adjacent to the first sprocket in an axial direction parallel to a rotational center axis of the bicycle rear sprocket assembly without another sprocket disposed between the first sprocket and the second sprocket, the first sprocket including
a first sprocket body;
a plurality of first sprocket teeth provided to an outer periphery of the first sprocket body, the plurality of first sprocket teeth including a first shifting initiation tooth and a second shifting initiation tooth, a plurality of first circumferential areas each of which has a first circumferential length corresponding to a single tooth pitch defined from a driving surface of a tooth of the first sprocket teeth to a driving surface of an adjacent tooth of the first sprocket teeth, the adjacent tooth being adjacent to the tooth without another tooth of the first sprocket teeth therebetween;

a first total number of the plurality of first circumferential areas is an even number;

a first shifting facilitation area in which the first shifting initiation tooth is disposed, the first shifting facilitation area including a first axially recessed portion to facilitate an upshifting operation;

a second shifting facilitation area in which the second shifting initiation tooth is disposed, the second shifting facilitation area including a second axially recessed portion to facilitate an upshifting operation;

a third shifting facilitation area configured to facilitate a shifting operation from the second sprocket to the first sprocket, the third shifting facilitation area including a third axially recessed portion to facilitate a downshifting operation, the third axially recessed portion being disposed between the second axially recessed portion and the first axially recessed portion in a driving rotational direction configured to move a bicycle in the forward direction; wherein the third axially recessed portion is adjacent to the first axially recessed portion;

a first circumferential area counting number from a driving surface of the first shifting initiation tooth to a driving surface of the second shifting initiation tooth in the driving rotational direction with respect to the rotational center axis of the bicycle rear sprocket assembly being an odd number; and a second circumferential area counting number from the driving surface of the second shifting initiation tooth to the driving surface of the first shifting initiation tooth in the driving rotational direction being an odd number; and the first circumferential area counting number being different from the second circumferential area counting number.

2. The bicycle rear sprocket assembly according to claim 1, wherein
the second sprocket includes
a second sprocket body;
a plurality of second sprocket teeth provided to an outer periphery of the second sprocket body, a plurality of second circumferential areas each of which has a second circumferential length corresponding to a single tooth pitch defined from a driving surface of a tooth of the second sprocket teeth to a driving surface of an adjacent tooth of the second sprocket teeth, the adjacent tooth being adjacent to the tooth without another tooth of the second sprocket teeth therebetween; and
a second total number of the plurality of second circumferential areas being an even number and being smaller than the first total number of the plurality of first circumferential areas;
the first total number of the plurality of first circumferential areas minus the second total number of the plurality of second circumferential areas being equal to or larger than two; and
the first shifting facilitation area and the second shifting facilitation area being configured to facilitate a shifting operation from the first sprocket to the second sprocket.

3. The bicycle rear sprocket assembly according to claim 2, wherein
the plurality of first sprocket teeth includes a neighboring tooth adjacent to the second shifting initiation tooth without another tooth between the second shifting initiation tooth and the neighboring tooth on the outer periphery of the first sprocket body in an upstream side of the driving rotational direction from the second shifting initiation tooth; and
the plurality of second sprocket teeth includes a chain-supporting tooth disposed between the second shifting initiation tooth and the neighboring tooth in a circumferential direction with respect to the rotational center axis when viewed from the axial direction.

4. The bicycle rear sprocket assembly according to claim 3, wherein
the chain-supporting tooth has a tooth height that is larger than those of the plurality of the second sprocket teeth.

5. The bicycle rear sprocket assembly according to claim 3, wherein
the chain supporting tooth has a recess on an axial facing surface facing the first sprocket.

6. The bicycle rear sprocket assembly according to claim 5, wherein
a top surface of the recess is configured to contact a bicycle chain during an upshifting operation.

7. The bicycle rear sprocket assembly according to claim 2, wherein
the first shifting facilitation area and the second shifting facilitation area being configured to facilitate a shifting operation from the first sprocket to the second sprocket.

8. The bicycle rear sprocket assembly according to claim 2, wherein
the plurality of first sprocket teeth are configured to engage with a bicycle chain that includes a plurality of outer link plates and a plurality of inner link plates; and
the first shifting initiation tooth and the second shifting initiation tooth are configured to engage with a pair of outer link plates when the bicycle chain shifts from the first sprocket to the second sprocket, the outer link plates in each of the pairs of outer link plates face each other in the axial direction.

9. The bicycle rear sprocket assembly according to claim 8, wherein
the bicycle chain is prevented from shifting from the first sprocket to the second sprocket when one of the first shifting initiation tooth and the second shifting initiation tooth engages with a pair of inner link plates, the inner link plates in each of the pairs of inner link plates face each other in the axial direction.

10. The bicycle rear sprocket assembly according to claim 1, wherein
the third shifting facilitation area is partly overlapped with the first shifting facilitation area.

11. The bicycle rear sprocket assembly according to claim 1, wherein
the third axially recessed portion is configured differently from the first axially recessed portion.

12. A bicycle rear sprocket assembly comprising:
a first sprocket and a second sprocket, the second sprocket being adjacent to the first sprocket in an axial direction parallel to a rotational center axis of the bicycle rear sprocket assembly without another sprocket disposed between the first sprocket and the second sprocket, the first sprocket including a first sprocket body, a plurality of angular segments resulting from equally dividing the first sprocket body into even-numbered and equal to or more than ten angular segments;

a plurality of first sprocket teeth provided to an outer periphery of the first sprocket body, the plurality of first sprocket teeth including a first shifting initiation tooth and a second shifting initiation tooth, the first shifting initiation tooth being entirely disposed in a first angular segment among the plurality of angular segments and the second shifting initiation tooth being entirely disposed in a second angular segment among the plurality of angular segments;

a first total number of the plurality of angular segments being an even number;

a first shifting facilitation area in which the first shifting initiation tooth is disposed, the first shifting facilitation area including a first axially recessed portion to facilitate an upshifting operation;

a second shifting facilitation area in which the second shifting initiation tooth is disposed, the second shifting facilitation area including a second axially recessed portion to facilitate an upshifting operation;

a third shifting facilitation area configured to facilitate a shifting operation from the second sprocket to the first sprocket, the third shifting facilitation area including a third axially recessed portion to facilitate a downshifting operation, the third axially recessed portion being disposed between the second axially recessed portion and the first axially recessed portion in a driving rotational direction configured to move a bicycle in the forward direction; wherein the third axially recessed portion is adjacent to the first axially recessed portion;

a first angular segment counting number from the first angular segment to a third angular segment in the driving rotational direction with respect to the rotational center axis of the bicycle rear sprocket assembly being an odd number; and a second angular segment counting number from the second angular segment to a fourth angular segment in the driving rotational direction being an odd number;

the third angular segment being adjacent to the second angular segment without another angular segment between the second angular segment and the third angular segment in an upstream side of the driving rotational direction, the fourth angular segment being adjacent to the first angular segment without another angular segment between the first angular segment and the fourth angular segment in an upstream side of the driving rotational direction, and the first angular segment counting number being different from the second angular segment counting number.

13. The bicycle rear sprocket assembly according to claim 12, wherein the second sprocket includes a second sprocket body, a plurality of angular segments resulting from equally dividing the second sprocket body into even-numbered and equal to or more than ten angular segments;

a plurality of second sprocket teeth provided to an outer periphery of the second sprocket body; and a second total number of the plurality of angular segments that is an even number and smaller than the first total number of the plurality of angular segments of the first sprocket; and the first total number of the plurality of angular segments of the first sprocket minus the second total number of the plurality of angular segments of the second sprocket being equal to or larger than two.

14. The bicycle rear sprocket assembly according to claim 13, wherein the first shifting facilitation area and the second shifting facilitation area being configured to facilitate a shifting operation from the first sprocket to the second sprocket.

15. The bicycle rear sprocket assembly according to claim 12, wherein the third axially recessed portion is configured differently from the first axially recessed portion.

16. A bicycle rear sprocket assembly comprising:

a first sprocket including a first sprocket body;

a plurality of first sprocket teeth provided to an outer periphery of the first sprocket body, the plurality of first sprocket teeth including a first shifting initiation tooth and a second shifting initiation tooth, a plurality of first circumferential areas each of which has a first circumferential length corresponding to a single tooth pitch defined from a driving surface of a tooth of the first sprocket teeth to a driving surface of an adjacent tooth of the first sprocket teeth, the adjacent tooth being adjacent to the tooth without another tooth of the first sprocket teeth therebetween;

a first total number of the plurality of first circumferential areas is an even number;

a first shifting facilitation area in which the first shifting initiation tooth is disposed;

a second shifting facilitation area in which the second shifting initiation tooth is disposed;

a first circumferential area counting number from a driving surface of the first shifting initiation tooth to a driving surface of the second shifting initiation tooth in a driving rotational direction with respect to a rotational center axis of the bicycle rear sprocket assembly being an odd number; and a second circumferential area counting number from the driving surface of the second shifting initiation tooth to the driving surface of the first shifting initiation tooth in the driving rotational direction being an odd number;

the first circumferential area counting number being different from the second circumferential area counting number;

the plurality of first sprocket teeth including a neighboring tooth adjacent to the second shifting initiation tooth without another tooth between the second shifting initiation tooth and the neighboring tooth on the outer periphery of the first sprocket body in an upstream side of the driving rotational direction from the second shifting initiation tooth; and a second sprocket including a second sprocket body;

a plurality of second sprocket teeth provided to an outer periphery of the second sprocket body, a plurality of second circumferential areas each of which has a second circumferential length corresponding to a single tooth pitch defined from a driving surface of a tooth of the second sprocket teeth to a driving surface of an adjacent tooth of the second sprocket teeth, the adjacent tooth being adjacent to the tooth without another tooth of the second sprocket teeth therebetween; and a second total number of the plurality of second circumferential areas being an even number and being smaller than the first total number of the plurality of first circumferential areas;

the second sprocket being adjacent to the first sprocket in an axial direction parallel to the rotational center axis of the bicycle rear sprocket assembly without another sprocket disposed between the first sprocket and the second sprocket;

the first total number of the plurality of first circumferential areas minus the second total number of the plurality of second circumferential areas being equal to or larger than two; and the plurality of second sprocket teeth including a chain-supporting tooth disposed between the second shifting initiation tooth and the neighboring tooth in a circumferential direction with respect to the rotational center axis when viewed from the axial direction, the chain-supporting tooth having a tooth height that is larger than those of the plurality of the second sprocket teeth.

* * * * *